(12) United States Patent
Matsumoto

(10) Patent No.: US 9,386,213 B2
(45) Date of Patent: Jul. 5, 2016

(54) IMAGE CAPTURE APPARATUS THAT CAN DETERMINE APPROPRIATE FOCUS POSITION, IMAGE CAPTURE METHOD, AND STORAGE MEDIUM

(71) Applicant: CASIO COMPUTER CO., LTD., Shibuya-ku, Tokyo (JP)

(72) Inventor: Kosuke Matsumoto, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 52 days.

(21) Appl. No.: 14/104,981

(22) Filed: Dec. 12, 2013

(65) Prior Publication Data
US 2014/0192216 A1     Jul. 10, 2014

(30) Foreign Application Priority Data

Dec. 19, 2012     (JP) ................................. 2012-277138

(51) Int. Cl.
| H04N 5/232 | (2006.01) |
| --- | --- |
| H04N 5/228 | (2006.01) |
| H04N 5/235 | (2006.01) |

(52) U.S. Cl.
CPC ......... *H04N 5/23212* (2013.01); *H04N 5/2356* (2013.01); *H04N 5/23219* (2013.01); *H04N 5/23232* (2013.01)

(58) Field of Classification Search
CPC .......... H04N 5/23212; H04N 13/0217; H04N 5/2226; H04N 5/23248; H04N 13/0235; H04N 2013/0081; H04N 5/23251; H04N 9/045

USPC ................... 348/208.1, 222.1, 345, 352, 362
See application file for complete search history.

(56) References Cited

U.S. PATENT DOCUMENTS

| 8,111,321 | B2 | 2/2012 | Yoshida | |
| --- | --- | --- | --- | --- |
| 2006/0238640 | A1* | 10/2006 | Hofer ................. | H04N 5/23212 348/345 |

(Continued)

FOREIGN PATENT DOCUMENTS

| EP | 2 166 408 A1 | 3/2010 |
| --- | --- | --- |
| JP | 2001116980 A | 4/2001 |

(Continued)

OTHER PUBLICATIONS

Japanese Office Action dated Dec. 2, 2014, issued in counterpart Japanese Application No. 2012-277138.

(Continued)

*Primary Examiner* — Trung Diep
(74) *Attorney, Agent, or Firm* — Holtz, Holtz & Volek PC

(57) ABSTRACT

An image capture apparatus includes the image capture unit 16, the focus information acquisition unit 53, the frequency distribution calculation unit 54, and the photographing position determination unit 55. The focus information acquisition unit 53 calculates a subject focus position for each of a plurality of regions into which a photographed screen of a captured image captured by the image capture unit 16 is divided. The frequency distribution calculation unit 54 counts the number of regions that corresponds to each of the subject focus positions acquired by way of measuring. The photographing position determination unit 55 determines the focus position for photographing according to the number of regions that corresponds to each of the subject focus positions calculated by the focus information acquisition unit 53.

17 Claims, 8 Drawing Sheets

(56) References Cited

U.S. PATENT DOCUMENTS

| | | | |
|---|---|---|---|
| 2008/0278589 A1* | 11/2008 | Thorn | H04N 5/23212 348/208.14 |
| 2009/0115882 A1* | 5/2009 | Kawarada | G03B 7/28 348/340 |
| 2011/0273471 A1 | 11/2011 | Nagasaka et al. | |
| 2011/0298964 A1 | 12/2011 | Hikida | |
| 2012/0293627 A1* | 11/2012 | Ishii | H04N 13/0011 348/46 |
| 2012/0293672 A1* | 11/2012 | Nonaka | G03B 5/00 348/208.5 |

FOREIGN PATENT DOCUMENTS

| | | |
|---|---|---|
| JP | 2001333316 A | 11/2001 |
| JP | 2003114378 A | 4/2003 |
| JP | 2006308813 A | 11/2006 |
| JP | 2007-282152 A | 10/2007 |
| JP | 2009213123 A | 9/2009 |
| JP | 2010-072134 A | 4/2010 |
| JP | 2010097211 A | 4/2010 |
| JP | 2010166519 A | 7/2010 |
| JP | 2010-177741 A | 8/2010 |
| JP | 2010-206552 A | 9/2010 |
| JP | 2010279054 A | 12/2010 |
| JP | 2011191617 A | 9/2011 |
| JP | 2012195797 A | 10/2012 |

OTHER PUBLICATIONS

Japanese Office Action (and English translation thereof) dated Mar. 24, 2015, issued in counterpart Japanese Application No. 2012-277138.

* cited by examiner

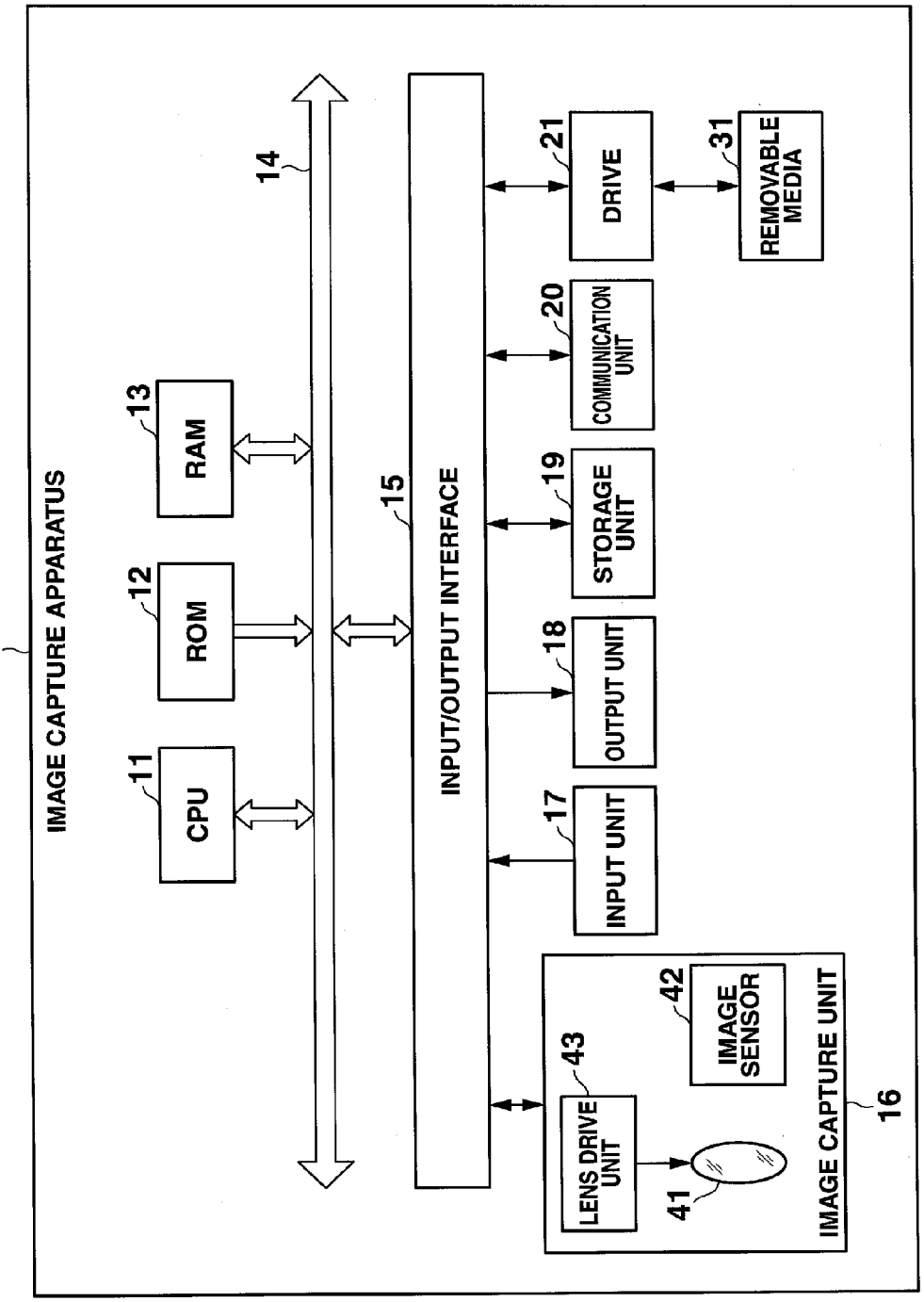

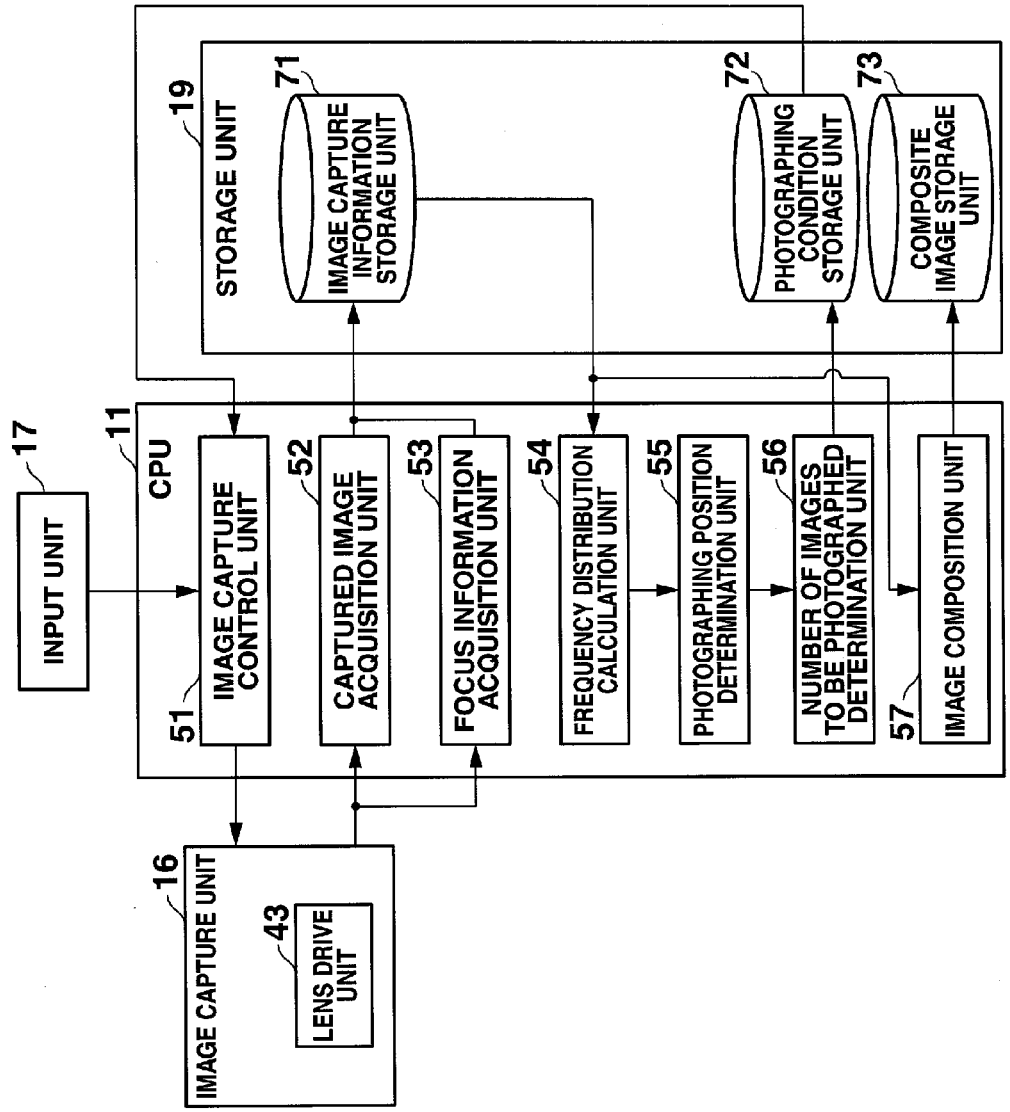

FIG.8A

| PHOTOGRAPHING MODE | PREFERENTIAL FOCUS POSITION |
|---|---|
| LANDSCAPE | INFINITY |
| FLOWER | FOCUS POSITION WITH MORE REGIONS ON MACRO EDGE SIDE EXCLUDING INFINITY |
| PERSON | FOCUS POSITION AT WHICH FACE DETECTION IS PERFORMED REGARDLESS OF NUMBER OF REGIONS<br>PRIORITIZING SUBJECT FOCUS POSITION WITH MORE REGIONS IN WHICH FACE IS DETECTED IF A PLURALITY OF FACES IS DETECTED |
| SELF-PHOTO | FOCUS POSITION AT WHICH FACE DETECTION IS PERFORMED REGARDLESS OF NUMBER OF REGIONS |
| CENTER WEIGHTED METERING | FOCUS POSITION WITH MORE REGIONS IN WHICH WEIGHTING IS ADDED AT THE CENTER OF AN IMAGE |
| ⋮ | ⋮ |

| 1 | 1 | 1 | 1 | 1 |
|---|---|---|---|---|
| 1 | 2 | 2 | 2 | 1 |
| 1 | 2 | 4 | 2 | 1 |
| 1 | 2 | 2 | 2 | 1 |
| 1 | 1 | 1 | 1 | 1 |

FIG.8C

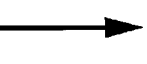

IMAGE CAPTURE APPARATUS THAT CAN DETERMINE APPROPRIATE FOCUS POSITION, IMAGE CAPTURE METHOD, AND STORAGE MEDIUM

This application is based on and claims the benefit of priority from Japanese Patent Application No. 2012-277138, filed on 19 Dec. 2012, the content of which is incorporated herein by reference.

BACKGROUND OF THE INVENTION

1. Field of the Invention

The present invention relates to an image capture apparatus, an image capture method, and a storage medium.

2. Related Art

Conventionally, in a case of photographing an image by focusing on all of the subjects positioned from forwards to backwards within a frame (hereinafter, referred to as "omnifocal image"), a special lens such as an ultra deep lens (commonly known as a "bug's-eye lens") has been used in an image capture apparatus.

However, the bug's-eye lens is quite long, and thus not convenient for carrying.

Therefore, technology has been disclosed, as in Japanese Unexamined Patent Application, Publication No. 2007-282152, that generates data of an omnifocal image by an image capture apparatus equipped with a normal lens photographing substantially at the same time subjects in an identical frame at a plurality of focus positions by a single shutter operation, and then compositing the data of a plurality of captured images thus acquired.

SUMMARY OF THE INVENTION

An image capture apparatus according to a first aspect of the present invention includes an image capture unit; a measuring unit that measures a subject focus position for each of a plurality of regions into which a captured image captured by the image capture unit is divided; a counting unit that counts the number of regions that corresponds to each of the subject focus positions acquired from measuring by way of the measuring unit; and a determining unit that determines a focus position for photographing according to the number of regions that corresponds to each of the subject focus positions counted by the counting unit.

An image capture method according to a second aspect of the present invention is an image capture method executed by an image capture apparatus including an image capture unit, the method including: measuring a subject focus position for each of a plurality of regions into which a captured image captured by the image capture unit is divided; counting the number of regions that corresponds to each of the subject focus positions acquired from measuring by way of the measuring; and determining a focus position for photographing according to the number of regions that corresponds to each of the subject focus positions counted by the counting.

A computer readable storage medium according to a third aspect of the present invention is a non-transitory storage medium encoded with a computer-readable program that enables a computer controlling an image capture apparatus having an image capture unit to execute: a measuring function for measuring a subject focus position for each of a plurality of regions into which a captured image captured by the image capture unit is divided; a counting function for counting the number of regions that corresponds to each of the subject focus positions acquired from measuring by way of the measuring function; and a determining function for determining a focus position for photographing according to the number of regions that corresponds to each of the subject focus positions counted by the counting function.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 2 is a block diagram showing a hardware configuration of an image capture apparatus according to an embodiment of the present invention;

FIG. 3 is a functional block diagram showing a functional configuration for executing omnifocal image generation processing among the functional configurations of the image capture apparatus of FIG. 2;

FIGS. 8A, 8B, and 8C are schematic diagrams showing specific examples of weighting in a frequency distribution.

DETAILED DESCRIPTION OF THE INVENTION

First Embodiment

In the following, an image capture apparatus according to a first embodiment of the present invention is described with reference to the drawings.

An omnifocal image is generated in the present embodiment by acquiring a captured image that constitutes a plurality of omnifocal images by focus bracketing photography, and compositing the captured image.

It should be noted that the omnifocal image refers to not only an image that is perfectly in focus in the entire region focused, but also includes an image in which it is fully in focus in the entire region when judged by human eyes.

Here, "focus bracketing photography" refers to a photographing method of acquiring captured images by consecutively shooting a plurality of captured images at a position of focusing on an arbitrary subject (a predetermined focus position) and at positions in which the focus is dislocated back and forth by driving to adjust the lens drive unit (a focus position dislocated from the predetermined focus position), respectively, upon pressing once a shutter button that is an input unit equipped with an image capture apparatus.

In the present embodiment, the focus bracketing photography does not photograph a captured image at a focus position with a predetermined interval but photographs a captured image at a focus position determined by considering a distance to a subject included in a photographing region, i.e. a position that focuses on the subject.

Figure 1A:
FIGS. 1A and 1B are schematic views showing outlines of focus bracketing photography in an embodiment of the present invention.
Figure 1B:
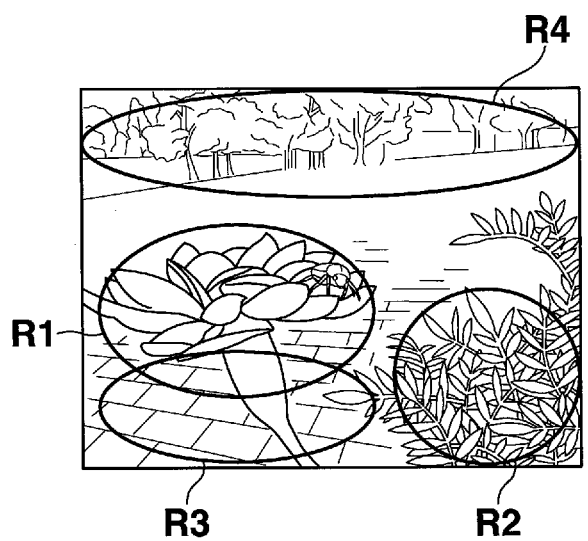

FIGS. 1A and 1B are schematic views showing an outline of focus bracketing photography in an embodiment of the present invention. It should be noted that the example examples of FIGS. 1A and 1B illustrate a case of photographing a "flower", "plant", or the like in a "park".

In a case of photographing a photographing region as shown in FIG. 1A, a "flower" or "plant" located in front of a "park" as background is included, and a "flower" and "plant" located close and "tiles" and "trees" located behind the "flower" and "plant" become subjects that can be specified.

It is preferable for the omnifocal image with a photographing region as in FIG. 1A to have a "flower", "plant", "tiles", and "trees" that can be specified as subjects to be in focus.

In other words, as shown in FIG. 1B, preferable as the omnifocal image is a captured image in which respective regions including a region R1 in which a "flower" is in focus, a region R2 in which a "plant" is in focus, a region R3 in which "tiles" are in focus, and a region R4 in which "trees" are in focus are in focus.

However, in a case of conventional focus bracketing photography, it is set to perform focus bracketing photography regardless of photographing condition. Specifically, conventional methods perform photographing of a predetermined number of images by displacing a focus position by a predetermined interval. Then, an omnifocal image is generated by compositing captured images acquired by the photographing.

With such a conventional method, since it performs photographing at a predetermined focus position regardless of the photographing target, there have been problems such as cases in which an omnifocal image with lower quality having blurred portions is generated or, in the worst case, an omnifocal image cannot be generated.

However, with focus bracketing photography in the present embodiment, as shown in FIG. 1B, since a focus position and the number of images to be photographed are determined by considering the photographing target, it is possible to generate an omnifocal image with high quality, and furthermore, since it can save unnecessary photographing, it becomes possible to achieve high-speed processing of generating an omnifocal image and to reduce processing load with high quality image.

Next, an image capture apparatus is described which has a function of generating a preferable omnifocal image by way of the focus bracketing photography as described above.

FIG. 2 is a block diagram showing a hardware configuration of an image capture apparatus 1 according to an embodiment of the present invention.

The image capture apparatus 1 is configured as, for example, a digital camera.

As shown in FIG. 2, the image capture apparatus 1 includes a CPU (Central Processing Unit) 11, ROM (Read Only Memory) 12, RAM (Random Access Memory) 13, a bus 14, an Input/Output interface 15, an image capture unit 16, an input unit 17, an output unit 18, a storage unit 19, a communication unit 20, and a drive 21.

The CPU 11 executes various processing according to programs that are recorded in the ROM 12, or programs that are loaded from the storage unit 19 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the input unit 17, the output unit 18, the storage unit 19, the communication unit 20, and the drive 21 are connected to the input/output interface 15.

The image capture unit 16 includes an optical lens unit 41, an image sensor 42, and a lens drive unit 43.

In order to photograph a subject, the optical lens unit 41 is configured by a lens such as a focus lens and a zoom lens.

The focus lens is a lens that is driven by the lens drive unit 43 (described later) and forms an image of a subject on the light receiving surface of the image sensor 42 (described later). The zoom lens is a lens that causes the focal length to freely change in a certain range.

The image sensor 42 is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit 41 forms an image of a subject in the optoelectronic conversion device. The optoelectronic conversion device optoelectronically converts (i.e. captures) the image of the subject, accumulates the resultant image signal for a predetermined time interval, and sequentially supplies the accumulated image signal as an analog signal to the AFE.

The AFE executes a variety of signal processing such as A/D (Analog/Digital) conversion processing of the analog signal. The variety of signal processing generates a digital signal that is output as an output signal from the image capture unit 16. Such an output signal of the image capture unit 16 is data of a captured image. Data of a captured image is supplied to the CPU 11, etc. as necessary. Furthermore, to the data of a captured image is added information of photographing order and information of focus position at the time of photographing as meta data. It should be noted that, unless otherwise noted, data of a captured image to which meta data is added is referred to as merely "data of a captured image".

The lens drive unit 43 focuses on a predetermined subject by driving a focus lens of the optical lens unit 41 based on the result of autofocus (AF) processing by the CPU 11 to change a focus position.

In the image capture apparatus 1 having such a focus mechanism, it is possible to photograph an image by focusing on a subject on a near side, i.e. the shortest photographing distance direction, and it is also possible to photograph with the target at the infinite distance direction, i.e. a far distance so that focusing adjustment is unnecessary.

Furthermore, the lens drive unit 43 drives so as to make it possible to perform focus bracketing photography that captures images sequentially with different focus positions while changing positions decided by the AF processing.

The input unit 17 is configured by various buttons including a shutter button and inputs a variety of information in accordance with instruction operations by the user.

The output unit 18 is configured by the display unit, a speaker, and the like, and outputs images and sound.

The storage unit 19 is configured by a hard disk, DRAM (Dynamic Random Access Memory) or the like, and stores data of various images.

The communication unit 20 controls communication with other devices (not shown) via networks including the Internet.

A removable medium 31 composed of a magnetic disk, an optical disk, a magneto-optical disk, semiconductor memory or the like is installed in the drive 21, as appropriate. Programs that are read via the drive 21 from the removable medium 31 are installed in the storage unit 19, as necessary. Similarly to the storage unit 19, the removable medium 31 can also store a variety of data such as the image data stored in the storage unit 19.

Next, a functional configuration for executing omnifocal image generation processing among the functional configurations of the image capture apparatus 1 is explained.

The "omnifocal image generation processing" refers to a sequence of processing of performing focus bracketing photography for which a photographing position and the number of images to be photographed are determined by considering the subjects in a photographing region; compositing a plurality of pieces of captured image data acquired; and generating and outputting omnifocal image data in which a plurality of subjects included in the photographing region is in focus.

FIG. 3 is a functional block diagram showing a functional configuration for executing omnifocal image generation processing among the functional configurations of the image capture apparatus 1.

Furthermore, the image capture apparatus 1 of the present embodiment performs not only the focus bracketing photography, but also multi-area AF photography for determining a photographing position and the number of images to be photographed for the focus bracketing photography. Here, the "multi-area AF photography" refers to a method of dividing a captured image into a plurality of focus regions and detecting, as a subject focus position, a distance at which a subject included in each of the focus regions is in focus for each focus region. The subject focus position is represented as a value for a distance at which a subject is in focus, in a range of macro (for example, 10 cm) to infinity ("∞").

It should be noted that the subject focus position is not limited to one that is measured by way of an AF method such as contrast detection AF and phase detection AF, a lens drive method, or the like, and it may be one that measures a direct distance to a subject by ultrasonic waves or the like.

When the image capture apparatus 1 performs the omnifocal image generation processing, as shown in FIG. 3, an image capture control unit 51, a captured image acquisition unit 52, a focus information acquisition unit 53, a frequency distribution calculation unit 54, a photographing position determination unit 55, a number of images to be photographed determination unit 56, and an image composition unit 57 function in the CPU 11.

Furthermore, an image capture information storage unit 71, a photographing condition storage unit 72, and a composite image storage unit 73 are provided as areas of the storage unit 19.

Captured image data which is outputted from the image capture unit 16 and acquired by the captured image acquisition unit 52 is stored in the image capture information storage unit 71. More specifically, captured image data acquired by way of the multi-area AF photography and captured image data acquired by way of the focus bracketing photography are stored in the image capture information storage unit 71.

Furthermore, information of the subject focus position of each region in the captured image acquired by the focus information acquisition unit 53 along with the captured image data is stored in the image capture information storage unit 71.

Photographing conditions in the focus bracketing photography are stored in the photographing condition storage unit 72. More specifically, photographing conditions of a stop position of a focus lens (hereinafter, referred to as "photographing position") and the number of images to be photographed that is calculated from the photographing position are stored in the photographing condition storage unit 72 as photographing conditions for the focus bracketing photography.

Furthermore, information used for setting a photographing condition such as the feature of depth of field of a lens is stored in the photographing condition storage unit 72. The feature of depth of field of a lens is stored in the photographing condition storage unit 72 as table data.

The composite image storage unit 73 stores omnifocal image data that is generated as a result of compositing captured images by the image composition unit 57.

The image capture control unit 51 controls to capture an image at the image capture unit 16 including the lens drive unit 43, etc. based on the instructions for image capturing from the input unit 17. More specifically, when there is a performance of half-push shutter button (half shutter) of the input unit 17, the image capture control unit 51 interprets the operation as an instruction to perform the multi-area AF photography, and thus controls the image capture unit 16 including the lens drive unit 43 and the like so as to perform the multi-area AF photography. Furthermore, when there is a performance of full-push shutter button (full shutter) of the input unit 17, the image capture control unit 51 interprets the operation as an instruction to perform the focus bracketing photography, and thus controls the image capture unit 16 including the lens drive unit 43 and the like so as to perform the focus bracketing photography.

The captured image acquisition unit 52 acquires captured image data for determining a photographing condition for the multi-area AF photography and captured image data for compositing images for the focus bracketing photography (for generating an omnifocal image) and has these captured image data stored in the image capture information storage unit 71.

The focus information acquisition unit 53 acquires information of the subject focus position in a region that is divided in a captured image upon acquiring the captured image by the captured image acquisition unit 52. Furthermore, the focus information acquisition unit 53 also acquires information of a focus region in which it is in focus ultimately (hereinafter, referred to as "AF region") from among the subject focus positions. The captured image acquisition unit 52 associates the information above with the captured image data for determining a photographing condition thus acquired and has it stored in the image capture information storage unit 71.

The frequency distribution calculation unit 54 calculates a distribution of frequencies of the subject focus position between macro to infinity (hereinafter, referred to as "frequency distribution") based on information of the subject focus position in all of the focus regions in the captured image acquired by the focus information acquisition unit 53 stored in the image capture information storage unit 71. The frequency distribution calculation unit 54 outputs the frequency distribution thus calculated to the photographing position determination unit 55.

The photographing position determination unit 55 determines a photographing position based on the frequency distribution calculated by the frequency distribution calculation unit 54 and the feature of depth of field of a lens stored in the photographing condition storage unit 72. The photographing position determination unit 55, for example, determines a photographing position so that the subject focus position with higher frequency is set to be a photographing position mainly. By determining the photographing position in such a way, it becomes possible to acquire a captured image that is focused on at least a main subject. The photographing position determination unit 55 outputs the photographing position thus determined to the number of image to be photographed determination unit 56.

The number of image to be photographed determination unit 56 determines the number of images to be photographed by counting the photographing positions determined by the photographing position determination unit 55. In other words, the number of image to be photographed determination unit 56, for example, sets five images to be photographed when the photographing positions determined are five regions.

Furthermore, the number of image to be photographed determination unit 56 outputs information of the photographing positions determined by the photographing position determination unit 55 and information of the number of images to be photographed determined to the photographing condition storage unit 72 to be stored.

The image composition unit 57 composites a plurality of pieces of captured image data acquired by the focus bracketing photography stored in the image capture information storage unit 71. The image composition unit 57 is eligible in terms of a method for generating data of an omnifocal image so long as it can composite a plurality of focus regions in captured images and generates data of an omnifocal image that is a composite image by way of various methods such as additive synthesis. The image composition unit 57 stores the data of omnifocal image thus generated in the composite image storage unit 73.

Here, the method of determining photographing positions and the number of images to be photographed is explained in detail.

Figure 4A:
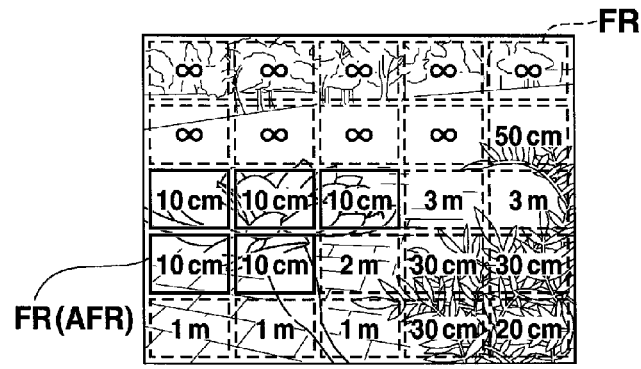
FIGS. 4A, 4B, and 4C are schematic diagrams showing a specific example for a method of determining a photographing position and the number of images to be photographed.
Figure 4B:
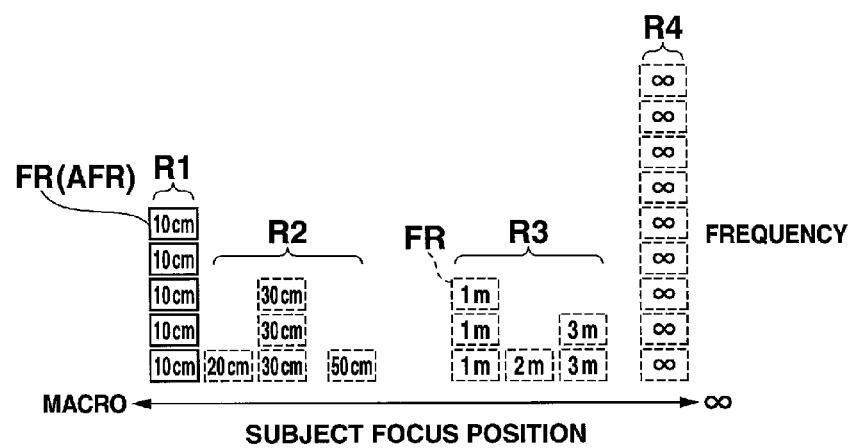
Figure 4C:
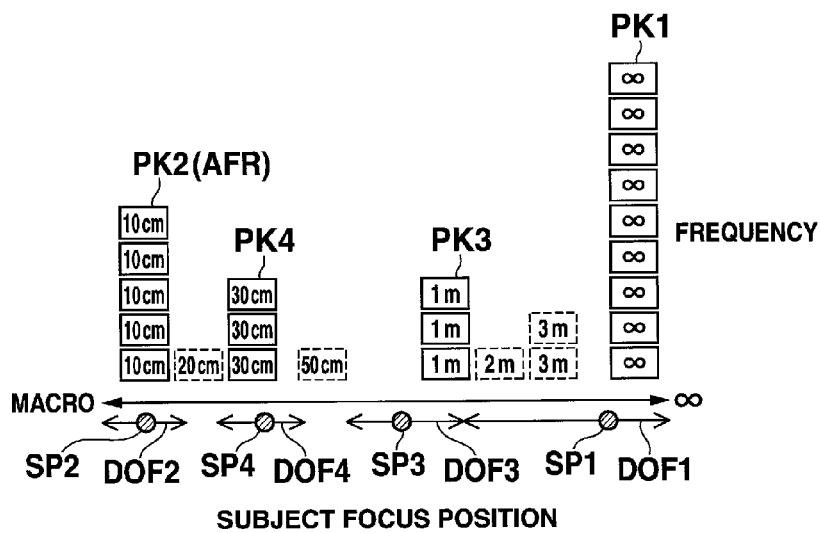

FIGS. 4A, 4B and 4C are schematic views showing a specific example of a method of determining photographing positions and the number of image to be photographed. It should be noted that, in the examples of FIGS. 4A, 4B, and 4C, examples of photographing the photographing regions of FIGS. 1A and 1B are used as examples.

In determining a photographing position and the number of images to be photographed, the subject focus position in each focus region FR of a captured image is acquired by way of the multi-area AF photography as shown in FIG. 4A.

In the present embodiment, the focus region FR is divided into 25 pieces of focus regions FR in a captured image with a matrix of 5 rows and 5 columns in a grid pattern. In each of the focus regions FR, the subject focus position between macro to infinity is determined.

It should be noted that, in FIG. 4A, regions shown with solid lines refer to AF regions AFR that are in focus ultimately from among the focus regions FR, and regions shown with dashed lines refer to focus regions FR that are not the AF regions AFR from among the focus regions FR.

The subject focus positions of each focus region FR in the captured image in the present example are "infinity ∞", "3 m", "2 m", "1 m", "50 cm", "30 cm", "20 cm", and "10 cm", respectively.

In such a captured image, as shown in FIG. 4B, the focus region FR in which "infinity ∞" becomes the subject focus position corresponds to a region R4 in which "trees" in FIG. 1B are in focus; the focus region FR in which "3 m", "2 m", and "1 m" become the subject focus position corresponds to a region R3 in which "tiles" in FIG. 1B are in focus; the focus region FR in which "50 cm", "30 cm", and "20 cm" become the subject focus position corresponds to a region R2 in which the "plant" in FIG. 1B is in focus; and the focus region FR in which "10 cm" becomes the subject focus position corresponds to a region R1 in which the "flower" in FIG. 1B is in focus. Therefore, it proves that the actual photographing targets correspond to the subject focus positions.

Next, in determining photographing positions and the number of images to be photographed, as a frequency distribution, as shown in FIG. 4B, each focus region FR is arranged in the order of the subject focus positions and the focus regions FR having the same subject focus position are stacked, which represents the frequency.

More specifically, the frequency distribution for the subject focus position of "10 cm" is five regions; the frequency distribution for the subject focus position of "20 cm" is one region; the frequency distribution for the subject focus position of "30 cm" is three regions; the frequency distribution for the subject focus position of "50 cm" is one region; the frequency distribution for the subject focus position of "1 m" is three regions; the frequency distribution for the subject focus position of "2 m" is one region; the frequency distribution for the subject focus position of "3 m" is two regions; and the frequency distribution for the subject focus position of "infinity ∞" is nine regions.

In the present embodiment, the subject focus position with a frequency of at least a predetermined number (three regions) becomes a peak position PK that is set as a photographing position mainly. In the case of FIG. 4B, the subject focus position of "10 cm", the subject focus position of "30 cm", the subject focus position of "1 m", and the subject focus position of "infinity ∞" become the peak positions PK1 to PK4, respectively (refer to FIG. 4C).

In such a frequency distribution, as shown in FIG. 4C, the depths of field DOF1 to DOF4 are arranged at the positions including the peak positions PK1 to PK4, in each of the depths of field DOF1 to DOF4 thus arranged, photographing positions SP1 to SP4 are determined to be positioned at positions covering the peak positions PK1 to PK4 and other subject focus positions. It should be noted that a method of arranging the depth of field and determining a photographing position is explained later.

In the example of FIG. 4C, four regions are determined as photographing positions according to the subject focus positions. As a result, for example, it is possible to reduce the number of images to be photographed, as compared to the case of photographing five images by way of the focus bracketing photography conventionally. A reduction in images to be photographed leads not only to a reduction in processing load for photographing, but also to shortening of photographing time, a result of which it becomes possible to shorten a duration of time exposed to blurring caused by a hand during photographing, thereby contributing to the acquisition of a captured image with higher quality. Furthermore, it is also possible to shorten the duration of time for compositing images with fewer numbers of images. Therefore, it is possible to shorten the time required for generating a final omnifocal image due to both aspects of shortening the duration of time of photographing and shortening the duration of time for compositing images.

Next, a method of arranging a depth of field and determining a photographing position is described.

Figure 5:
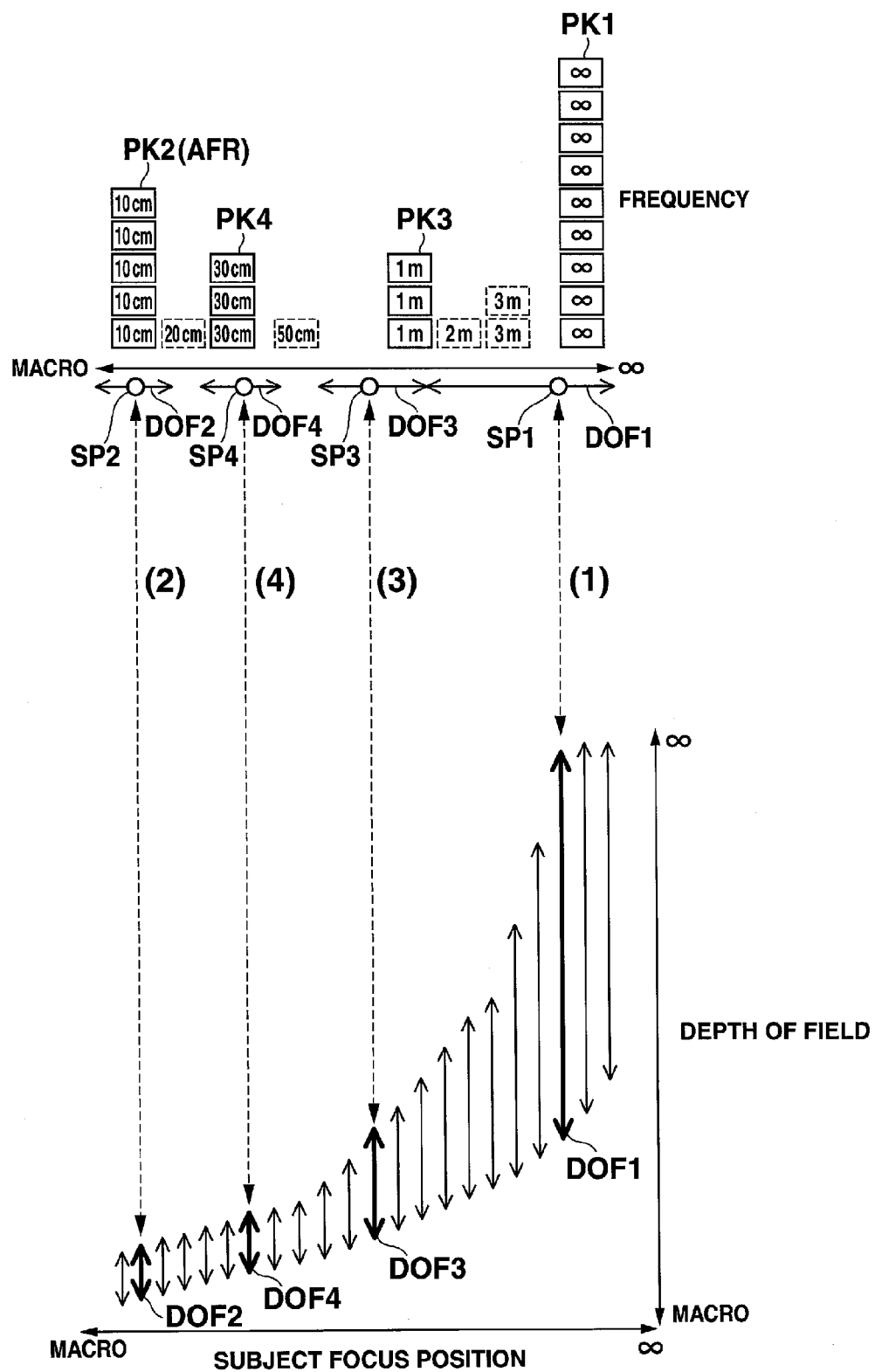
FIG. 5 is a diagram showing a specific example of a method of arranging a depth of field and determining a photographing position.

FIG. 5 is a diagram showing a specific example of a method of arranging a depth of field and determining a photographing position with an aperture value at the time of photographing. It should be noted that the depth of field of a lens of the present embodiment has a feature in which a scope of depth of field becomes broader from macro toward infinity (∞).

Initially, in the present embodiment, a photographing position of the peak position PK1, which has the highest frequency, is determined from among the peak positions PK1 to PK4. In such a case, the depth of field DOF1, which covers the broadest scope including the peak position PK1, is selected. Then, the photographing position SP1 is determined at a position covering other subject focus positions belonging to the depth of field DOF1, while carefully considering the peak position PK1 belonging within the depth of field.

Next, a photographing position of peak position PK2, which has the second highest frequency, is determined from among the peak positions PK2 to PK4. In such a case, the depth of field DOF2, which covers the broadest scope including the peak position PK2, is selected. Then, the photographing position SP2 is determined at a position covering other subject focus positions belonging to the depth of field DOF2, while carefully considering the peak position PK2 belonging to within the depth of field.

Next, a photographing position with higher frequency between the peak positions PK3 and PK4 is determined. In the present example, the frequency of the peak position PK3 and the frequency of the peak position PK4 are the same at three regions. If the frequency has the same number, the peak position belonging to the deeper depth of field is preferentially determined. Since the depth of field of the lens of the present example has the feature whereby the scope of focus becomes broader and the depth of field becomes deeper as the subject focus position becomes farther, the peak position PK3 of the subject focus position that is positioned farther than the peak position PK4 thereof is determined.

Here, the depth of field DOF3, which covers the broadest scope including the peak position PK3, is selected. Then, the photographing position SP3 is determined at a position covering the peak position PK3 belonging within the scope of the depth of field and other subject focus positions.

Finally, the depth of field DOF4, which includes the peak position PK4 having the same frequency as that of the peak position PK3 and belonging to the shallower depth of field as well as covers the broadest scope, is selected. Then, the photographing position SP4 is determined at a position that covers the peak position PK4 belonging to within the scope of the depth of field and other subject focus positions.

It should be noted that, in a case in which a depth of field DOF selected so as to include a predetermined peak position PK includes another peak position PK, a depth of field DOF including only a predetermined peak position PK is selected again. Then, a photographing position SP is determined at a position that can cover other subject focus positions belong to the depth of field DOF thus selected, while carefully considering a peak position PK belonging within the depth of field.

As a result, in the present embodiment, four photographing positions are determined in the order of higher frequency from among the peak positions PK1 to PK4, of which the order is (1), (2), (3), and (4), and a photographing position is determined at a position that covers the entire subject focus position for eight regions (i.e, "infinity ∞", "3 m", "2 m", "1 m", "50 cm", "30 cm", "20 cm", and "10 cm").

It should be noted that, although the subject focus positions having at least a predetermined frequency (three regions) as peak positions are set as positions that determine photographing positions in the present example, the present invention is not limited thereto. A photographing position may be determined according to a frequency distribution of the subject focus positions for all of the subject focus positions (for example, in the order of higher frequency). In such a case, if determining a photographing position that includes the subject focus positions of which the photographing position is determined as described above and furthermore so that other focus positions can be covered by way of a depth of field, it is configured so as not to determine a photographing position of the other subject focus positions thus covered.

Next, another specific example of determining photographing positions and the number of images to be photographed with photographing regions different from those of FIGS. 1A and 1B described above is explained.

FIGS. 6A-6D are schematic diagrams showing another example of determining a photographing position and the number of images to be photographed in a case of different photographing regions from those of FIGS. 1A and 1B.

Figure 6A:
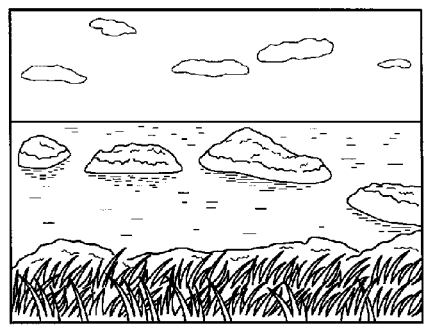
FIGS. 6A, 6B, 6C, and 6D are schematic diagrams showing other specific examples for determining a photographing position and the number of images to be photographed with a photographing region different from those of FIGS. 1A and 1B.

FIG. 6A is different from FIG. 1A and shows a picture in which the ocean is photographed from a cliff. In FIG. 6A, a "plant" is shown to be located closer, "the ocean" and "islands" are located farther, a horizontal line is located farther thereto, and "the sky" is above the horizontal line.

Figure 6B:
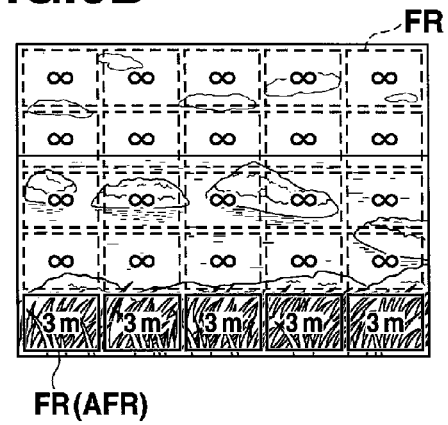

As shown in FIG. 6B, regarding the subject focus position of each focus region FR, the focus regions FR including the "plant" are "3 m", and the focus regions FR other than this including "the ocean", "islands", and "the sky" are "infinity ∞". It should be noted that the AF region AFR is the focus regions FR including the "plant" with the subject focus position of "3 m".

Figure 6C:
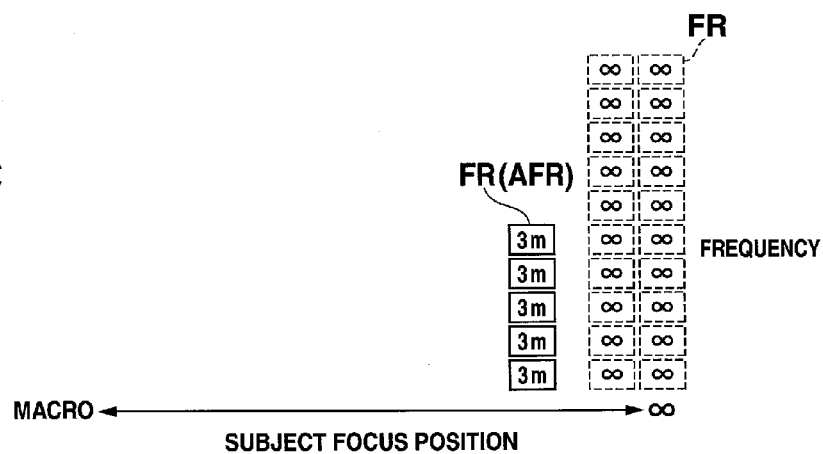

As shown in FIG. 6C, regarding the frequency distribution of each subject focus position, the subject focus positions of "3 m" are five regions and the subject focus positions of "infinity ∞" are twenty regions.

Figure 6D:
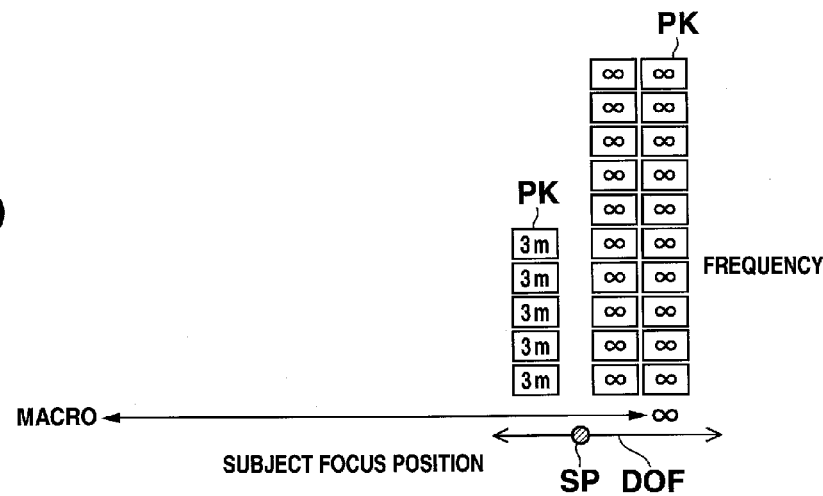

In such a state, as shown in FIG. 6D, the broadest depth of field DOF is selected in order to determine a photographing position.

In the present example, the entire subject focus position is covered since the broadest depth of field DOF is selected. In other words, the depth of field DOF thus selected covers the subject focus position of "3 m" and the subject focus position of "infinity ∞".

Therefore, the photographing position is determined to be a position where the subject focus position of "3 m" and the subject focus position of "infinity ∞", which becomes the peak positions PK, are considered mainly.

As a result, in the photographing region such as FIG. 6A, it becomes possible to generate an omnifocal image with a single photographing position of hyperfocal position.

Since it is possible to determine a photographing position and the number of images to be photographed according to photographing location in this way, it is possible to generate an omnifocal image preferably.

Next, a flow of omnifocal image generation processing executed by the image capture apparatus 1 having such a functional configuration is explained.

Figure 7:
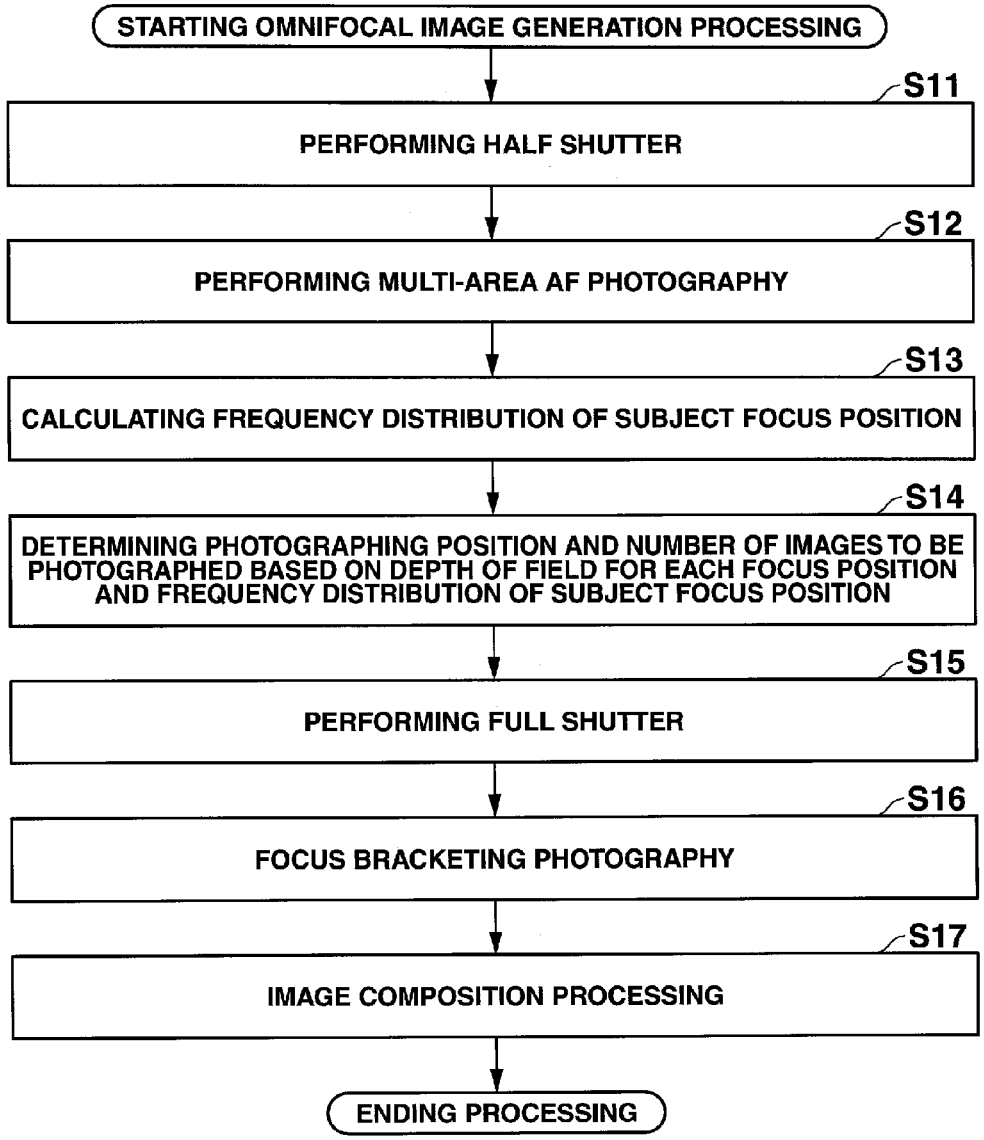
FIG. 7 is a flowchart showing a flow of omnifocal image generation processing executed by the image capture apparatus of FIG. 2 having the functional configuration of FIG. 3.

FIG. 7 is a flowchart showing a flow of omnifocal image generation processing executed by the image capture apparatus 1 of FIG. 2 having the functional configuration of FIG. 3. It should be noted that the flowchart of FIG. 7 illustrates an example in which FIGS. 1A and 1B are photographing regions.

The omnifocal image generation processing starts when a user performs a predetermined operation for executing the omnifocal image generation processing using the input unit 17.

In Step S11, the capture image control unit 51 detects a performance of half-push shutter button (half shutter) of the input unit 17 from a user. The multi-area AF photography is performed by the performance of half-push shutter button (half shutter).

In Step S12, the image capture control unit 51 controls the image capture unit 16 to have the image capture unit 16 perform the multi-area AF photography. The captured image acquisition unit 52 acquires captured image data for determining a photographing condition and has the data stored in the image capture information storage unit 71. Then, the focus information acquisition unit 53 also acquires the subject focus position for each focus region FR in the captured image thus acquired. Furthermore, the focus information acquisition unit 53 also acquires a region in which it is in focus ultimately (AF region). The focus information acquisition unit 53 associates the subject focus position of each focus region and information of the AF region with the captured image data for determining a photographing condition and has the information stored in the image capture information storage unit 71.

For example, the captured image shown in FIG. 1A and the subject focus position for each focus region and the information of the AF region in the captured image shown in FIG. 4A are stored in the image capture information storage unit 71.

In Step S13, the frequency distribution calculation unit 54 calculates a frequency distribution of the subject focus positions. In other words, the frequency distribution calculation unit 54 calculates a frequency distribution of the subject focus positions based on information of the subject focus position for each focus region stored in the image capture information storage unit 71. In the present embodiment, for example, as shown in FIG. 4B, a frequency of the subject focus positions from macro to infinity ∞ is counted and distributed for each subject focus position.

In Step S14, the photographing position determination unit 55 and the number of image to be photographed determination unit 56 determines photographing positions and the number of images to be photographed based on the frequency distribution of the depth of field of each focus position and the subject focus positions.

More specifically, as shown in FIG. 4C, the photographing position determination unit 55 selects the depth of field DOF based on the distributions of the peak positions of PK1 to PK4, which are the subject focus positions, with at least a predetermined number calculated by the frequency distribution calculation unit 54 and a feature of the depth of field of a lens stored in the photographing condition storage unit 72, and determines a photographing position SP at a position that covers other subject focus positions belonging to the depth of field DOF thus selected, while carefully considering the peak position PK belonging to within the depth of field.

Then, the number of image to be photographed determination unit 56 determines the number of images to be photographed (four images) by counting the number of the photographing positions SP1 to SP4 determined by the photographing position determination unit 55. Thereafter, the information of the photographing positions determined by the photographing position determination unit 55 and the information of the number of images to be photographed thus determined are outputted from the number of image to be photographed determination unit 56 and stored in the photographing condition storage unit 72.

Although it is necessary to photograph five images normally, it is sufficient to photograph only four images in the present example. Therefore, as compared to the normal case of photographing five images, the photographing time shortens, which can reduce the influence of blurring caused by a hand, etc. and improve image quality, and furthermore, processing load for image compositing is reduced, which can shorten the time for image compositing, a result of which it becomes possible to shorten a time for generating an omnifocal image.

In Step S15, the image capture control unit 51 detects a performance of full-push shutter button (full shutter) of the input unit 17 from a user. The focus bracketing photography comes to be performed by the performance of full-push shutter button (full shutter).

In Step S16, the image control unit 51 controls the image capture unit 16 to perform the focus bracketing photography. The image capture control unit 51 controls the image capture unit 16 so as to photograph images at photographing positions set by a predetermined number of times set, based on a setting of a photographing condition stored in the photographing condition storage unit 72 (a photographing position and the number of images to be photographed). Thereafter, the captured image acquisition unit 52 acquires captured image data outputted from the image capture unit 16 by the focus bracketing photography and has the data stored in the image capture information storage unit 71.

In Step S17, the image composition unit 57 performs processing (image composition processing) of compositing captured image data which are photographed with the photographing condition determined (photographing positions and the number of image to be photographed) and acquired by way of the focus bracketing photography stored in the image capture information storage unit 71. The image composition unit 57, for example, sequentially composites images close to a focus position of a captured image to generate a composite image. As a result thereof, data of a single omnifocal image is generated. Thereafter, the image composition unit 57 stores the data of the omnifocal image thus generated in the composite image storage unit 73. The omnifocal image generation processing thereby ends.

Modified Embodiment

In the embodiment described above, the photographing positions and the number of images to be photographed are determined according to the positions of subjects included in photographing regions.

On the other hand, in the present example, a photographing position and the number of images to be photographed are determined by considering a subject included in a photographing region. In other words, it is configured so as to determine a focus position preferentially.

More specifically, a photographing mode is provided that fits a photographing target to be assumed. In such a photographing mode, it is possible to determine a focus position (a photographing position) preferentially according to a photographing target by changing the weighting of a frequency of the subject focus positions according to the photographing target.

Information of a setting for weighting for determining the focus position and the number of images to be photographed according to such a photographing mode is stored in the image capture information storage unit 71. Then, at the frequency distribution calculation unit 54, a frequency distribution of the subject focus position to which the weighting is added is calculated.

FIGS. 8A, 8B, and 8C are schematic views showing specific examples of weighting in a frequency distribution.

As shown in FIG. 8A, photographing modes such as "landscape", "flower", "person", "self-photo" or "center weighted metering" are set as the photographing mode, for example. A user changes a mode from among the above-mentioned photographing modes in accordance with a condition supposed for performing photography.

The "landscape" photographing mode is a mode that is set in a case of photographing landscape and sets weighting so as to preferentially determine a photographing position to the subject focus position at infinity.

The "flower" photographing mode is a mode that is set in a case of photographing a flower, etc. in a close up manner and sets weighting so as to preferentially determine a photographing position to the subject focus position with more regions on a macro edge side excluding infinity.

The "person" photographing mode is a mode that is set in a case of photographing a person and sets weighting so as to preferentially determine a photographing position to a focus position on which face detection is performed regardless of the number of regions of the subject focus positions. It should be noted that, in a case of a plurality of faces being detected, the "person" photographing mode prioritizes the subject focus position with more regions in which faces are detected.

The "self-photo" photographing mode is a mode that is set in a case of self-photographing and sets weighting so as to preferentially determine a photographing position to a focus position at which face detection is performed regardless of the number of regions of the subject focus positions.

The "center weighted metering" photographing mode is a mode that is set in a case of photographing an image in which exposure is determined with weighting being added at the center of a captured image and sets weighting so as to preferentially determine a photographing position at a focus position at the center of the image.

Furthermore, since there is a tendency to photograph an image with a main subject being located at the center of a photographing region, it may be configured so as to set weighting specifically added at the center portion heavily. In such a case, as shown in FIG. 8B, for example, it can be set that weighting on the subject focus position FP at the center portion is heavily added and the weighting becomes lighter as distancing from the center. In other words, the subject focus position FP at the center counts four times, the subject focus positions FP around the subject focus position FP at the center counts two times, and the subject focus positions FP at the outer side counts one time.

Furthermore, in a case in which adjacent subject focus positions FP show the same value, since it indicates that an identical subject is often included therein, it may be configured so as to set weighting by the number of the adjacent subject focus positions.

In such a case, as shown in FIG. 8C, ten adjacent subject focus positions FP shows "infinity ∞", it counts as ten; six adjacent subject focus positions FP shows "10 cm", it counts as six; three adjacent subject focus positions FP shows "30 cm", it counts as three; and two adjacent subject focus positions FP shows "1 m", it counts as two. Since "2 m" and "3 m" do not have an adjacent subject focus position FP, these count as one.

According to the image capture apparatus 1 as described above, it includes the image capture unit 16, the focus information acquisition unit 53, the frequency distribution calculation unit 54, and the photographing position determination unit 55.

The focus information acquisition unit 53 acquires the subject focus position for each of a plurality of regions into which a photographed screen of a captured image captured by the image capture unit 16 is divided.

The frequency distribution calculation unit 54 counts the number of regions that corresponds to each of the subject focus positions acquired by the focus information acquisition unit 53.

The photographing position determination unit 55 determines photographing positions based on the depth of field of the image capture unit 16 (a focus stop position, a focus position for photographing) according to the number of regions that corresponds to each of the subject focus positions counted by the frequency distribution calculation unit 54.

Accordingly, in the image capture apparatus 1, it is possible to determine a focus position by considering a subject included in the photographing regions. It should be noted that, in a case of determining a focus position for photographing by considering each of the subjects overall included in the photographing regions, the number of the focus positions for photographing is less than the number of the subject focus positions.

With such a configuration, with the image capture apparatus 1, it is possible to determine a focus position appropriate for focus bracketing in order to acquire captured images used for an omnifocal image.

Furthermore, the photographing position determination unit 55 determines a photographing position based on the feature of the depth of field of a lens stored in the photographing condition storage unit 72 in accordance with the number of regions that corresponds to each of the subject focus positions counted by the frequency distribution calculation unit 54.

With such a configuration, in the image capture apparatus 1, the number of focus positions for photographing is far less than the number of the subject focus positions.

Furthermore, in the image capture apparatus 1, it is possible to employ the determination as criteria for a user's judgment whether to perform image capturing.

Furthermore, the image capture apparatus 1 includes the number of images to be photographed determination unit 56 that determines the number of images to be photographed by way of focus bracketing according to the focus position for photographing that is determined by the photographing position determination unit 55.

With such a configuration, in the image capture apparatus 1, it is possible to reduce unnecessary photographing and shorten the time for generating an omnifocal image.

In addition, by prioritizing the subject focus position counted by the frequency distribution calculation unit 54, the photographing position determination unit 55 determines a focus position for photographing that corresponds to the subject focus position.

With such a configuration, in the image capture apparatus 1, it is possible to acquire a captured image that allows the generation of a high-quality omnifocal image to be performed.

The photographing position determination unit 55 determines a plurality of focus positions for photographing by considering overlap of the depths of field of the image capture unit 16 so that a focus state at each subject distance becomes a predetermined state.

With such a configuration, in the image capture apparatus 1, it is possible to reduce unnecessary photographing and shorten the time for generating an omnifocal image since a focus position is not decided at positions where the depth of field does not overlap, for example.

The photographing position determination unit 55 determines a focus position that is prioritized according to a photographing mode.

With such a configuration, in the image capture apparatus 1, since it is possible to determine a photographing position by considering a photographing condition that is already known in advance, it is possible to acquire a captured image used for generating an omnifocal image with high quality, i.e. a captured image in which a focus position is determined at an appropriate position.

In a photographing mode for photographing a person from among the photographing modes, a face is detected, and the photographing position determination unit 55 prioritizes a focus position of the face detected.

With such a configuration, in the image capture apparatus 1, it is possible to acquire a captured image in which the face is in focus, which is suitable for a case of photographing a person, and thus it is possible to generate an omnifocal image with high quality.

In a case in which a plurality of faces is detected, the photographing position determination unit 55 prioritizes a focus position that is detected in more regions from among the plurality of faces detected.

With such a configuration, in the image capture apparatus 1, it is possible to acquire a captured image in which a closer position or a bigger face is in focus in a case of photographing a plurality of persons, and thus it is possible to generate an omnifocal image with high quality.

The photographing position determination unit 55 determines a focus position for photographing by prioritizing the subject focus position to which weighting is added according to a distribution condition of regions of the same focus positions.

With such a configuration, in the image capture apparatus 1, for example, in a case of being the regions of the same focus position, since it is often an identical subject, it is possible to acquire a captured image in which the subject is considered, and thus it is possible to generate an omnifocal image with high quality.

The photographing position determination unit 55 adds heavy weighting if regions having the same focus position are adjacent to each other.

With such a configuration, in the captured image 1, since it is likely that the same subject is included if the regions of same focus position are adjacent to each other, it is possible to acquire a captured image in which the subject is considered, and thus it is possible to generate an omnifocal image with high quality.

Furthermore, the image capture apparatus 1 includes an image composition unit 57 that composites images.

The image composition unit 57 composites captured images photographed by way of a predetermined focus bracketing (focus bracketing photography) to generate an omnifocal image.

With such a configuration, in the image capture apparatus 1, since it is possible to perform the focus bracketing photography according to conditions of a photographing region, it is possible to reduce unnecessary photographing and shorten a time for generating an omnifocal image, and also possible to acquire a captured image in which a focus position is determined at an appropriate position to generate an omnifocal image with high quality, for example.

It should be noted that the present invention is not to be limited to the aforementioned embodiment, and that modifications, improvements, etc. within a scope that can achieve the object of the present invention are also included in the present invention.

Although the photographing position determination unit 55 determines the focus stop position in consideration of the entire subject focus positions in the embodiment above, the present invention is not limited thereto. For example, it may be configured that the photographing position determination unit 55 provides a threshold and determines a photographing position (focus stop position) by considering only the subject focus position having at least a predetermined number of the subject focus positions.

More specifically, a threshold value for the number of regions is provided, and the photographing position determination unit 55 determines a photographing position (focus stop position) by prioritizing a focus position in a region having at least a threshold value.

With such a configuration, in the image capture apparatus 1, it is possible to reduce unnecessary photographing and shorten a time for generating an omnifocal image since a focus position is not decided at positions where a depth of field does not overlap, for example.

Furthermore, although a photographing position, which is a focus stop position, is determined by prioritizing the frequency of the subject focus positions in the above-mentioned embodiment, the present invention is not limited thereto. For example, it may be configured so that a photographing position of a focus position belonging to the broadest depth of field is determined, and subsequently, a photographing position of an auto-focused focus position or a photographing position of a focus position that is arbitrarily set by a user is determined, and then a photographing position is determined according to the frequency of the focus positions. Furthermore, it may be configured so that a photographing position (focus stop position) is determined by prioritizing the broadest depth of field.

With such a configuration, in the image capture apparatus 1, for example, since a focus position is not decided at positions where a depth of field does not overlap, it is possible to reduce unnecessary photographing and shorten a time for generating an omnifocal image.

Furthermore, although it is configured so that an omnifocal image is generated based on the photographing position and the number of images to be photographed determined in the abovementioned embodiment, it is not limited thereto. For example, it may be configured so that a judgment result as to whether an omnifocal image can be generated or not is outputted to display on the output unit 18 for notifying a user, based on the photographing position and the number of images to be photographed determined. In such a case, a content in which an omnifocal image cannot be generated from captured images or a content in which a preferable omnifocal image can be generated is notified, for example.

Furthermore, it may be configured to use a live view image that is sequentially acquired for the judgment of whether an omnifocal image can be generated or not so as to judge whether an omnifocal image can be generated each time a live view image is acquired. In such a case, by a user turning an image capture apparatus toward a predetermined direction, the judgment for generation of an omnifocal image (determination of a photographing position and the number of images to be photographed) is made and the judgment result is outputted from the output unit 18. It is possible for a user to judge whether to execute the omnifocal image generation processing in consideration of this judgment result. Furthermore, if it is judged that an omnifocal image cannot be generated, unnecessary processing can be saved by not executing the omnifocal image generation processing.

More specifically, it can be configured so that a judgment unit is provided that judges whether captured images suitable for generating an omnifocal image can be acquired based on the photographing position determined by the photographing position determination unit 55, etc., and furthermore, an output control unit is provided that controls the output unit 18 so as to control to notify a judgment result by the judgment unit.

With such a configuration, it is possible to notify a user of whether a region that is currently planned to be photographed is suitable for generating an omnifocal image.

It should be noted that an output at the output unit 18 can be performed by way of a screen display, a sound, a lamp, etc.

Second Embodiment

In the following, an image capture apparatus according to a second embodiment of the present invention is described.

In the first embodiment as described above, the subject focus position between macro to infinity is determined at each of the focus regions prepared by dividing an image into a plurality of regions by way of the multi-area AF photography for determining a photographing position; the number of regions that correspond to each of the subject focus positions acquired thus determined is counted; and a focus position for photographing based on the depth of field of the image capture unit 16 is determined according to the number of regions corresponding to each of the subject focus positions thus counted. On the other hand, the second embodiment has a feature of determining the subject focus position based on a depth of field upon determining the subject focus position by way of the multi-area AF.

More specifically, in order to determine a photographing position, a plurality of focus positions appropriate for covering from macro to infinity based on a depth of field is initially determined; then, whether there is a subject within the depth of field in each of focus positions thus determined is judged for each multi-area region; and if it is judged that there is a subject, its focus position is made to be associated as the subject focus position with a region and acquired.

The number of regions of each of the subject focus positions thus determined is counted after whether there is a subject in each of focus positions is judged for each region, and a photographing position is determined according to the number of regions that corresponds to each of the subject focus positions thus counted. Upon determining the photographing position, the subject focus position that does not satisfy a predetermined number of regions is excluded from targets for photographing positions by prioritizing the number of regions.

It should be noted that, upon the captured image acquisition unit 52 acquiring a captured image, the focus information acquisition unit 53 determines a focus position appropriate for covering from macro to infinity based on the feature of a depth of field of a lens stored in the photographing condition storage unit 72; judges whether there is a subject in each of focus positions thus determined for each region prepared by dividing a captured image; and, if it is judged that there is a subject, associates its focus position as the subject focus position with a region and acquires the focus position. Furthermore, the focus information acquisition unit 53 also acquires information of a focus region that is made to be in focus ultimately, from among the focus positions.

As described above, the focus information acquisition unit 53 acquires the subject focus position based on the feature of a depth of field of a lens stored in the photographing condition storage unit 72 for each of a plurality of regions prepared by dividing a photographing screen of a captured image captured by the image capture unit 16.

With such a configuration, in the image capture apparatus 1, upon performing focus bracketing in order to acquire captured images used for generating an omnifocal image, an increase in speed can be anticipated compared to the abovementioned first embodiment. Furthermore, the number of focus positions acquired may decrease, a result of which the number of focus positions for photographing may also decrease, and thus it may be possible to decrease the number of images to be photographed.

It should be noted that, although whether there is a subject in the depth of field in each of focus positions determined is only judged in the abovementioned embodiment, it may be configured to count the number of subjects included and reflect the number of the subjects in the counting of the number of regions.

In the aforementioned embodiments, a digital camera has been described as an example of the image capture apparatus 1 to which the present invention is applied; however, the present invention is not particularly limited thereto. Furthermore, the present invention can be applied to an image processing apparatus that does not have an image capture function and performs the omnifocal image generation processing based on an image captured externally.

For example, the present invention can be applied to any electronic apparatus in general having the omnifocal image generation processing. More specifically, for example, the present invention can be applied to a lap-top personal computer, a printer, a television, a video camera, a portable navigation device, a cell phone device, a smart phone, a portable gaming device, and the like.

The processing sequence described above can be executed by hardware, and can also be executed by software.

In other words, the hardware configuration shown in FIG. 3 is merely an illustrative example, and the present invention is not particularly limited thereto. More specifically, the types of functional blocks employed to realize the above-described functions are not particularly limited to the example shown in FIG. 3, so long as the image capture apparatus 1 can be provided with the functions enabling the aforementioned processing sequence to be executed in its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 2 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), BD (Blu-ray Disc), or the like. The magnetic optical disk is composed of an MD (Mini-Disk) or the like. The storage medium supplied to the user in a state incorporated in the device main body in advance may include, for example, the ROM 12 shown in FIG. 2, a hard disk included in the storage unit 19 shown in FIG. 2 or the like, in which the program is recorded.

It should be noted that, in the present specification, the steps describing the program recorded in the storage medium include not only the processing executed in a time series following predetermined order, but also processing executed in parallel or individually, which is not necessarily executed in a time series.

Although some embodiments of the present invention have been described above, the embodiments are merely exemplification, and do not limit the technical scope of the present invention. Other various embodiments can be employed for the present invention, and various modifications such as omission and replacement are possible without departing from the spirits of the present invention. Such embodiments and modifications are included in the scope of the invention and the summary described in the present specification etc, and are included in the invention recited in the claims as well as the equivalent scope thereof.

While the present invention has been described with reference to the preferred embodiments, it is intended that the invention be not limited by any of the details of the description therein but includes all the embodiments which fall within the scope of the appended claims.

What is claimed is:

1. An image capture apparatus comprising:
an image capture unit;
a measuring unit that measures a subject focus position for each of a plurality of regions into which a captured image captured by the image capture unit is divided;
a counting unit that counts a number of regions, from among the plurality of regions into which the captured image is divided, that are determined to correspond to each of the subject focus positions measured by the measuring unit;
a determining unit that determines a focus position for photographing based on the number of regions counted by the counting unit that are determined to correspond to each of the subject focus positions; and
a calculating unit that calculates a number of images to be photographed by focus bracketing photography based on the focus position for photographing determined by the determining unit,
wherein the focus position for photographing is a different focus position from the subject focus positions measured by the measuring unit.

2. The image capture apparatus according to claim 1, wherein the determining unit determines the focus position for photographing such that the focus position is within a range of a depth of field of a lens included in the image capture unit, based on the number of regions counted by the counting unit that are determined to correspond to each of the subject focus positions.

3. The image capture apparatus according to claim 2, wherein the determining unit determines a plurality of focus positions for photographing by considering overlap of depths of field of the lens included in the image capture unit such that a focus state at each subject distance becomes a predetermined state.

4. The image capture apparatus according to claim 2, wherein the determining unit determines the focus position for photographing by prioritizing a subject focus position having a broader depth of field.

5. The image capture apparatus according to claim 1, wherein the measuring unit measures the subject focus position based on a depth of field of a lens included in the image capture unit for each of the plurality of regions into which the captured image captured by the image capture unit is divided.

6. The image capture apparatus according to claim 1, wherein the determining unit determines at least one focus position for photographing, and a number of the at least one focus position for photographing is less than a number of the subject focus positions.

7. The image capture apparatus according to claim 1, wherein the determining unit prioritizes a subject focus position for which a greater number of regions are counted by the counting unit, and determines the focus position for photographing that corresponds to the subject focus position prioritized by the determining unit.

8. The image capture apparatus according to claim 1, wherein the determining unit, with respect to a threshold value for the number of regions counted by the counting unit, determines the focus position for photographing by prioritizing a subject focus position for which the number of regions counted by the counting unit is at least the threshold value.

9. The image capture apparatus according to claim 1, wherein the determining unit determines the focus position for photographing by prioritizing a subject focus position according to a photographing mode.

10. The image capture apparatus according to claim 9, wherein in a photographing mode for photographing a person, from among a plurality of photographing modes, a face is detected, and the determining unit determines the focus position for photographing by prioritizing a focus position of the face having been detected.

11. The image capture apparatus according to claim 10, wherein, in a case in which a plurality of faces are detected, the determining unit prioritizes a focus position of a face that is detected in more regions than remaining ones of the plurality of faces having been detected.

12. The image capture apparatus according to claim 1, wherein the determining unit determines the focus position for photographing by prioritizing a subject focus position to which weighting is added according to a distribution condition of regions having same subject focus positions.

13. The image capture apparatus according to claim 12, wherein the determining unit adds a greater amount of weighting to regions having a same subject focus position which are adjacent to each other.

14. The image capture apparatus according to claim 1, further comprising:
a judging unit that judges whether a captured image suitable for generating an omnifocal image can be acquired, based on the focus position for photographing determined by the determining unit; and
an output control unit that controls an output unit so as to output a result of a judgment by the judging unit.

15. The image capture apparatus according to claim 1, further comprising:
an image composition unit that composites images;
wherein the image composition unit generates an omnifocal image by compositing images photographed by performing a predetermined focus bracketing photography.

16. An image capture method executed by an image capture apparatus including an image capture unit, the method comprising:
measuring a subject focus position for each of a plurality of regions into which a captured image captured by the image capture unit is divided;
counting a number of regions, from among the plurality of regions into which the captured image is divided, that are determined to correspond to each of the measured subject focus positions;
determining a focus position for photographing based on the counted number of regions that are determined to correspond to each of the subject focus positions; and
calculating a number of images to be photographed by focus bracketing photography based on the focus position for photographing determined by the determining,
wherein the focus position for photographing is a different focus position from the measured subject focus positions.

17. A non-transitory computer-readable storage medium having a program stored thereon that is executable to control a computer controlling an image capture apparatus having an image capture unit to execute:
a measuring function for measuring a subject focus position for each of a plurality of regions into which a captured image captured by the image capture unit is divided;

a counting function for counting a number of regions, from among the plurality of regions into which the captured image is divided, that are determined to correspond to each of the subject focus positions measured by the measuring function;

a determining function for determining a focus position for photographing based on the number of regions counted by the counting function that are determined to correspond to each of the subject focus positions; and a calculating function for calculating a number of images to be photographed by focus bracketing photography based on the focus position for photographing determined by the determining function, wherein the focus position for photographing is a different focus position from the subject focus positions measured by the measuring function.

* * * * *